United States Patent
Kazem et al.

(10) Patent No.: US 12,045,290 B2
(45) Date of Patent: Jul. 23, 2024

(54) RECOMMENDING TEMPLATE OF BUSINESS ANALYTICS APPLICATIONS BASED ON USER'S DATASET

(71) Applicant: International Business Machines Corporation, Armonk, NY (US)

(72) Inventors: Firas Kazem, Kanata (CA); Anthony Nicola Tasca, Ottawa (CA); Laura Marie Alkhoury, Ottawa (CA); Ahmed Hussein Mohamed Kamel El-Khouly, Kanata (CA); Mohammed Mostafa, Kanata (CA)

(73) Assignee: International Business Machines Corporation, Armonk, NY (US)

( * ) Notice: Subject to any disclaimer, the term of this patent is extended or adjusted under 35 U.S.C. 154(b) by 342 days.

(21) Appl. No.: 16/803,008

(22) Filed: Feb. 27, 2020

(65) Prior Publication Data

US 2021/0271709 A1 Sep. 2, 2021

(51) Int. Cl.
*G06F 16/904* (2019.01)
*G06F 40/186* (2020.01)
*G06Q 10/063* (2023.01)

(52) U.S. Cl.
CPC ........ *G06F 16/904* (2019.01); *G06F 40/186* (2020.01); *G06Q 10/063* (2013.01)

(58) Field of Classification Search
CPC .... G06F 16/904; G06F 40/186; G06Q 10/063
See application file for complete search history.

(56) References Cited

U.S. PATENT DOCUMENTS

| 7,885,918 | B2 | 2/2011 | Statchuk |
| 9,058,409 | B2 | 6/2015 | Chakra et al. |
| 9,286,329 | B2 | 3/2016 | Svarovsky et al. |
| 10,157,175 | B2 | 12/2018 | Grosset et al. |
| 10,229,186 | B1 | 3/2019 | Reiner et al. |
| 2008/0065634 | A1 | 3/2008 | Krinsky |
| 2013/0103677 | A1* | 4/2013 | Chakra ............... G06F 16/248 707/723 |
| 2014/0046934 | A1* | 2/2014 | Zhou ................... G06F 16/951 707/723 |

(Continued)

*Primary Examiner* — Hope C Sheffield
(74) *Attorney, Agent, or Firm* — Shackelford, McKinley & Norton, LLP; Robert A. Voigt, Jr.

(57) ABSTRACT

A computer-implemented method, system and computer program product for recommending a template or a dataset. A descriptor (input descriptor) of the input, corresponding to a dataset or a dashboard template, is extracted or fetched. The input descriptor may be the descriptor of the dataset which includes topics and concept combinations. Alternatively, the input descriptor may be the descriptor of the dashboard template which includes topics, concept combinations and column-to-visualization mappings. Scores are then generated for the candidate targets, corresponding to dashboard templates or datasets, based on one or more of the following: matching topics in the input descriptor with topics in the candidate target descriptors, matching concept combinations in the input descriptor with concept combinations in the candidate target descriptors, and determining compatibility of the datasets with the dashboard templates. Dashboard template(s) or dataset(s) are then recommended based on the generated scores for the candidate targets.

20 Claims, 5 Drawing Sheets

(56) References Cited

U.S. PATENT DOCUMENTS

2015/0186806 A1    7/2015  Hiltz-Laforge et al.
2017/0116294 A1*   4/2017  Ma ...................... H05K 999/00
2019/0188612 A1    6/2019  Cooper et al.

* cited by examiner

RECOMMENDING TEMPLATE OF BUSINESS ANALYTICS APPLICATIONS BASED ON USER'S DATASET

TECHNICAL FIELD

The present invention relates generally to business analytics applications, and more particularly to recommending a template (e.g., dashboard template, report template) based on the user's dataset or recommending a dataset based on the user's template.

BACKGROUND

Business analytics applications focus on developing new insights and understanding of business performance based on data and statistical methods. Typically, such applications involve the use of "dashboards." A dashboard is a user interface that organizes and presents information in a way that is easy to read. Furthermore, such dashboards may be interactive.

SUMMARY

In one embodiment of the present invention, a computer-implemented method for recommending a template or a dataset comprises extracting or fetching a descriptor of an input corresponding to a dataset or a dashboard template, where the descriptor of the dataset comprises topics and concept combinations, and where the descriptor of the dashboard template comprises topics, concept combinations and column-to-visualization mappings. The method further comprises generating scores for candidate targets corresponding to dashboard templates or datasets based on one or more of the following: matching topics in the input descriptor with topics in candidate target descriptors, matching concept combinations in the input descriptor with concept combinations in the candidate target descriptors and compatibility of the datasets with the dashboard templates. The method additionally comprises presenting one or more of the dashboard templates or one or more of the datasets to a user's computing device based on the scores for the candidate targets.

Other forms of the embodiment of the computer-implemented method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE DRAWINGS

A better understanding of the present invention can be obtained when the following detailed description is considered in conjunction with the following drawings, in which.

DETAILED DESCRIPTION

As stated in the Background section, business analytics applications focus on developing new insights and understanding of business performance based on data and statistical methods. Typically, such applications involve the use of "dashboards." A dashboard is a user interface that organizes and presents information in a way that is easy to read. Furthermore, such dashboards may be interactive.

Currently, users may find it difficult to build a dashboard, such as a business analytics dashboard, to visualize their datasets. As a result, users may attempt to utilize an existing dashboard or dashboard template, such as by building from it. However, identifying the correct template for a dataset is a difficult task, especially since systems do not take into account the datasets that have been used with the templates and how they were used in the visualizations of the templates as discussed below. "Visualizations," as used herein, refer to the graphical elements of the dashboard, such as those graphical elements that depict information from the dataset.

For example, suppose a financial specialist ("F1") builds a dashboard for financial planning purposes with a popular dataset ("S1"). The financial specialist ("F1") then makes the dashboard's template ("D") available for others to reuse.

Suppose further that another financial specialist ("F2") is looking for a dashboard to visualize his/her dataset ("S2"). The system may recommend the dashboard template ("D") for a variety of reasons, such as being popular with financial specialists, meeting F2's style preferences and is indexed against "financial" concepts. However, the dataset S2 may not be best visualized with the dashboard template D for the following reasons: a visualization in dashboard template D requires a data type that is not available in dataset S2 (e.g., geographical locations); dataset S2's column concepts (such as those deemed interesting) may not be best visualized with dashboard template D (e.g., dashboard template D was used with dataset S1 to showcase the concepts of "profit" and "cost," but dataset S2 may be best visualized with a dashboard that showcases the concepts of current and target "revenue"); and dataset S2's concept combinations (such as those deemed interesting) may not be best visualized with dashboard template D (e.g., dataset S2 is best visualized with widgets showing "revenue by business" and "revenue by time"; whereas, dashboard template D contains widgets that best visualize "sales by product" and "profit by product").

As a result, there is not currently a means for identifying the most appropriate dashboard/dashboard template to visualize the user's dataset.

The embodiments of the present invention provide a means for enabling the most appropriate dashboard/dashboard template to visualize the user's dataset be identified by matching dashboard templates and datasets based on how a dataset's columns can be used in the dashboard templates' visualizations as discussed further below.

In some embodiments, the present invention comprises a computer-implemented method, system and computer program product for recommending a template or a dataset. In one embodiment of the present invention, a descriptor (input descriptor) of the input, corresponding to a dataset or a dashboard template, is extracted or fetched. In one embodiment, the input descriptor may be the descriptor of the dataset which includes topics and concept combinations. In one embodiment, the input descriptor may be the descriptor of the dashboard template which includes topics, concept combinations and column-to-visualization mappings. "Topics," as used herein, refer to high-level concepts that are the subject of the context of a collection of visualizations of the dashboard or the pivotal concepts in a dataset. "Concept combinations," as used herein, refer to the joint utilization of two or more concepts, such as in a dataset or in a visualization of the dashboard. A "concept," as used herein, refers to an abstract idea or a general notion, such as a mental representation. "Column-to-visualization mappings," as used herein, refer to how the concepts and statistics of the columns of the dataset are mapped to the visualizations depicted in the dashboard. Furthermore, scores are generated for the candidate targets, corresponding to dashboard templates or datasets, based on one or more of the following: matching topics in the input descriptor with topics in the candidate target descriptors, matching concept combinations in the input descriptor with concept combinations in the candidate target descriptors, and determining compatibility of the datasets with the dashboard templates. A "target," as used herein, refers to the template (e.g., dashboard template) or dataset that is recommended based on the users' dataset or the user's template, respectively. A "candidate target," as used herein, refers to potential targets that could be recommended to be used by the user. A "candidate target descriptor," as used herein, refers to metadata describing the candidate target, which may include concepts, concept combinations, and statistics. Dashboard template(s) or dataset(s) are then recommended based on the generated scores for the candidate targets, such as by presenting those dashboard template(s) or dataset(s) to the user's computing device with a score that exceeds a threshold value. In this manner, the most appropriate dashboard template is recommended to visualize the user's dataset or the most appropriate dataset is recommended based on the user's template.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Figure 1:
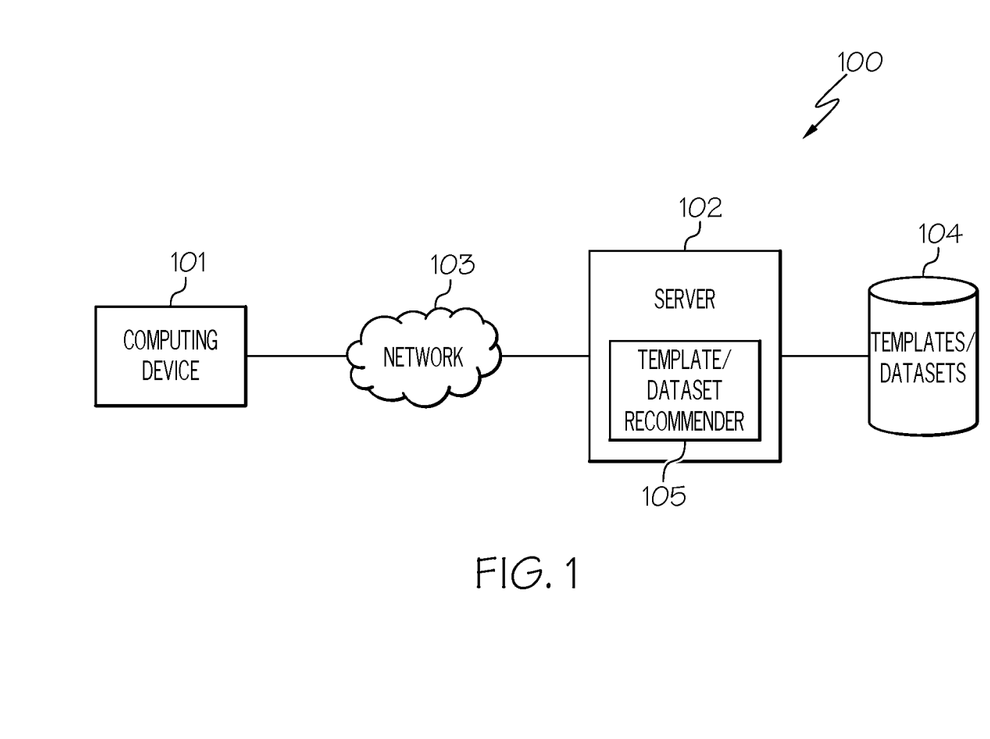
FIG. 1 illustrates a communication system for practicing the principles of the present invention in accordance with an embodiment of the present invention.

Referring now to the Figures in detail, FIG. 1 illustrates a communication system 100 for practicing the principles of the present invention in accordance with an embodiment of the present invention. Communication system 100 includes a computing device (also referred to as a "client device") 101 connected to a server 102 via a network 103. It is noted that both computing device 101 and the user of computing device 101 may be identified with element number 101. Furthermore, it is noted that a description of the hardware configuration of server 102 is provided below in connection with FIG. 2.

Computing device 101 may be any type of computing device (e.g., portable computing unit, Personal Digital Assistant (PDA), smartphone, laptop computer, mobile phone, navigation device, game console, desktop computer system, workstation, Internet appliance and the like) configured with the capability of connecting to network 103 and consequently communicating with other computing devices 101 and server 102.

In one embodiment, server 102 is configured to store templates, such as dashboard templates, in a database 104 connected to server 102. Such dashboard templates may be associated with descriptors (also referred to herein as "dashboard template descriptors") which are also stored alongside their associated dashboard templates in database 104. In one embodiment, such dashboard template descriptors include metadata, such as concept combinations for each visualization of the dashboard of the template as well as topics (high-level concepts) of the visualizations of the dashboard and column-to-visualization mappings in the dashboard. As discussed herein, such "column-to-visualization" mappings refer to how concepts and statistics of the columns of the dataset are mapped to the visualizations depicted in the dashboard. Furthermore, as discussed herein, such "concept combinations" refer to the joint utilization of two or more concepts (e.g., "profit" and "revenue"), such as in a dataset or in a visualization of the dashboard.

Furthermore, in one embodiment, database 104 may further store datasets, which may be recommended to the user (user of computing device 101) based on a template provided or selected by the user (user of computing device 101).

Network 103 may be, for example, a local area network, a wide area network, a wireless wide area network, a circuit-switched telephone network, a Global System for Mobile Communications (GSM) network, a Wireless Application Protocol (WAP) network, a WiFi network, an IEEE 802.11 standards network, various combinations thereof, etc. Other networks, whose descriptions are omitted here for brevity, may also be used in conjunction with system 100 of FIG. 1 without departing from the scope of the present invention.

In communication system 100, server 102 includes a software agent, referred to herein as the "template/dataset recommender" 105, configured to recommend a template (e.g., dashboard template) based on the user's dataset (dataset of the user of computing device 101) or recommend a dataset to the user (user of computing device 101) based on the user's template (e.g., dashboard template provided or selected by the user of computing device 101). In one embodiment, such a software agent utilizes the existing services and features of IBM® Cognos® Analytics, such as creating a template from an existing dashboard, where the dashboard template contains all the visualizations, layout and styling, but without the data sources.

Furthermore, IBM® Cognos® Analytics ("concept ontology registry" service) may be utilized by template/dataset recommender 105 to find relationships between different concepts by traversing a concept hierarchy.

Additionally, IBM® Cognos® Analytics ("smarts content recommender" service) may be utilized by template/dataset recommender 105 to identify interesting and pivotal content from any given dataset. Such a service identifies the pivotal concepts (topics) in a dataset and for each topic generates interesting column combinations (column combinations of data in the dataset) with applicable aggregates and filters that provide insights into the dataset. In one embodiment, the service deploys several data analysis techniques, including ontological classification of datasets, bivariate and multivariate analysis and driver analysis, to identify topics in a dataset and generate interesting column combinations for each topic as discussed above. In one embodiment, the service may generate a data descriptor that includes a list of topics and a list of concept combinations.

Additionally, IBM® Cognos® Analytics ("dashboard template descriptor extractor") may be utilized by template/dataset recommender 105 to identify the pivotal concepts (topics) in a dashboard as well as identify concept combinations that describe how data columns in the dataset are used in the visualizations of the dashboard. In one embodiment, the dashboard template descriptor extractor identifies the topics and concept combinations by deploying several techniques, including ontological classification of data columns, driver analysis, lexical analysis and contextual analysis of visual layouts. Furthermore, in one embodiment, the dashboard template descriptor extractor creates a descriptor of the dashboard template ("dashboard template descriptor") that includes a list of topics, a list of concept combinations and concept-to-visualization mappings that describe how data columns of the dataset are used within the visualizations of the dashboards.

Furthermore, IBM® Cognos® Analytics ("smarts visualization recommender" service) may be utilized by template/dataset recommender 105 to ensure that each visualization of the dashboard is matched to the most optimal column combination of data of the dataset. In one embodiment, such a service will measure the strength of the match by a numeric score. In one embodiment, matching is based on industry best practices, columns statistics and concepts and previous user/collective preferences. Furthermore, in one embodiment, the overall strength of the match between the list of visualizations and the list of column combinations is scored using such a service.

System 100 is not to be limited in scope to any one particular network architecture. System 100 may include any number of computing devices 101, servers 102, networks 103, databases 104 and template/dataset recommenders 105.

Figure 2:
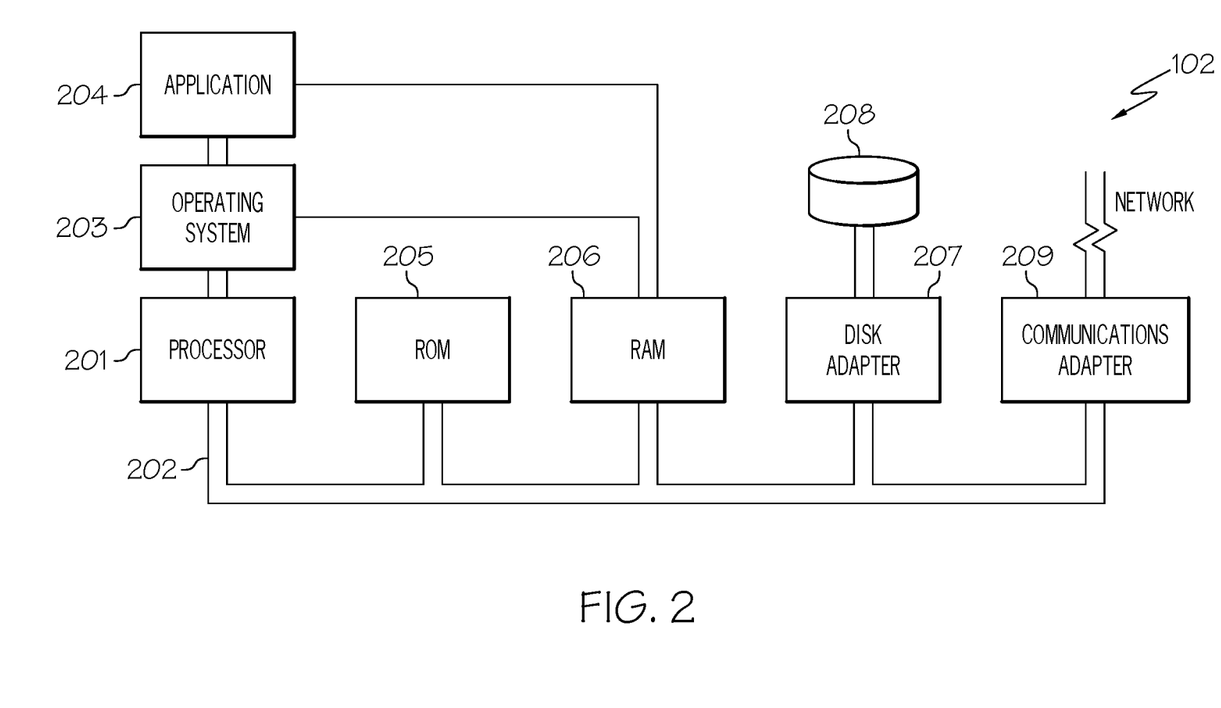
FIG. 2 illustrates an embodiment of the present invention of a hardware configuration of a server which is representative of a hardware environment for practicing the present invention.

Referring now to FIG. 2, FIG. 2 illustrates an embodiment of the present invention of a hardware configuration of server 102 (FIG. 1) which is representative of a hardware environment for practicing the present invention.

Server 102 has a processor 201 connected to various other components by system bus 202. An operating system 203 runs on processor 201 and provides control and coordinates the functions of the various components of FIG. 2. An application 204 in accordance with the principles of the present invention runs in conjunction with operating system 203 and provides calls to operating system 203 where the calls implement the various functions or services to be performed by application 204. Application 204 may include, for example, template/dataset recommender 105 (FIG. 1) for recommending a template based on the user's dataset or recommending a dataset to the user based on the user's template as discussed further below in connection with FIGS. 3-7.

Referring again to FIG. 2, read-only memory ("ROM") 205 is connected to system bus 202 and includes a basic input/output system ("BIOS") that controls certain basic functions of server 102. Random access memory ("RAM") 206 and disk adapter 207 are also connected to system bus 202. It should be noted that software components including operating system 203 and application 204 may be loaded into RAM 206, which may be server's 102 main memory for execution. Disk adapter 207 may be an integrated drive electronics ("IDE") adapter that communicates with a disk unit 208, e.g., disk drive. It is noted that the program for recommending a template based on the user's dataset or recommending a dataset to the user based on the user's template, as discussed further below in connection with FIGS. 3-7, may reside in disk unit 208 or in application 204.

Server 102 may further include a communications adapter 209 connected to bus 202. Communications adapter 209 interconnects bus 202 with an outside network (e.g., network 103 of FIG. 1) thereby allowing server 102 to communicate with other devices, such as computing device 101.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As stated above, there is not currently a means for identifying the most appropriate dashboard/dashboard template to visualize the user's dataset.

Figure 3:
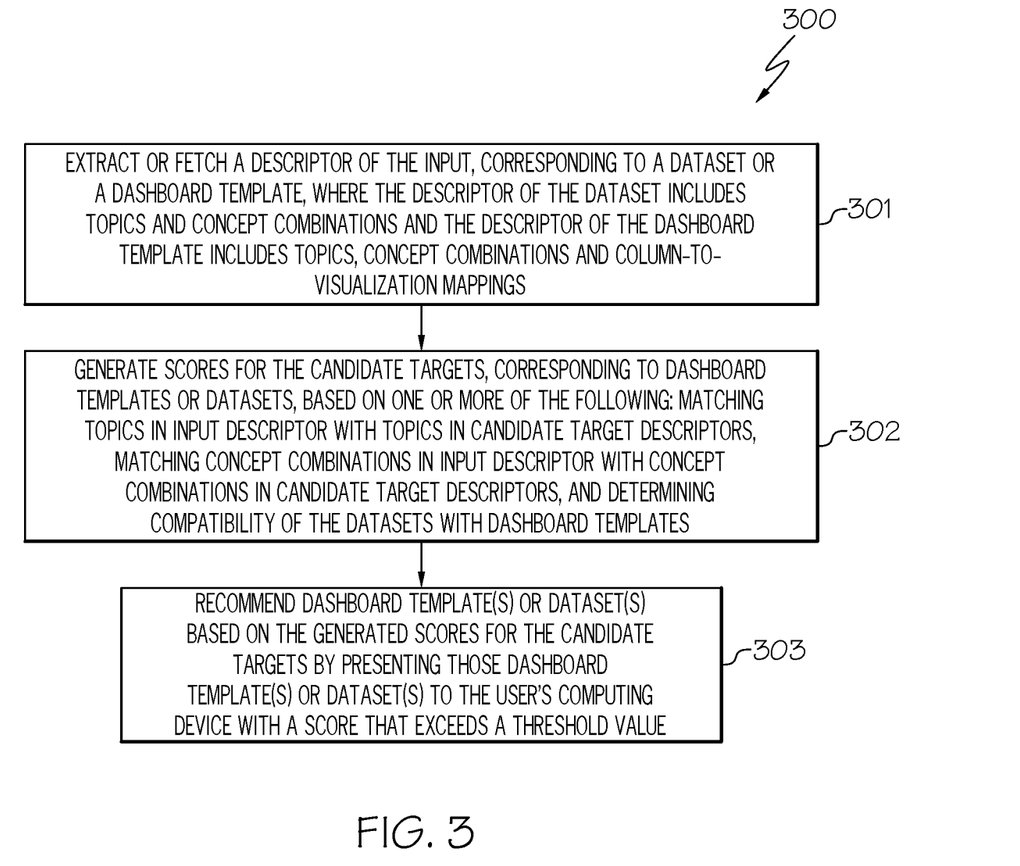
FIG. 3 is a flowchart of a method for recommending a template based on the user's dataset or recommending a dataset based on the user's template in accordance with an embodiment of the present invention.
Figure 4:
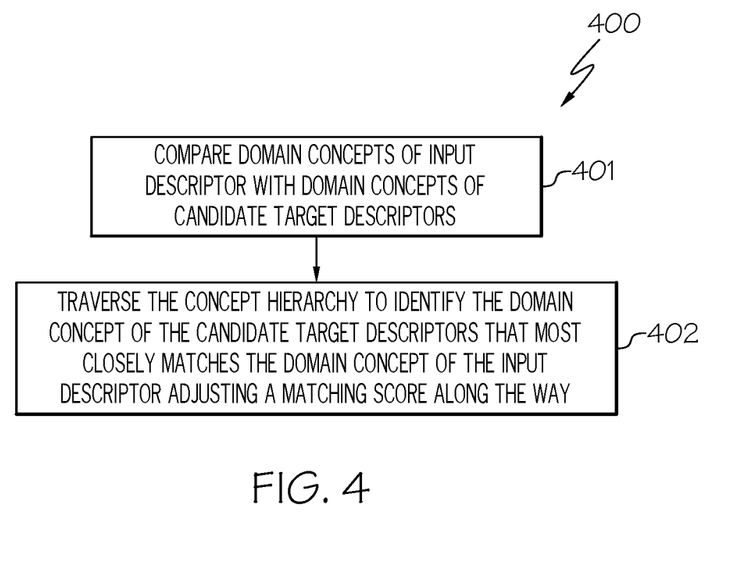
FIG. 4 is a flowchart of a method for matching topics in the input descriptor with the topics in the candidate target descriptors in accordance with an embodiment of the present invention.
Figure 5:
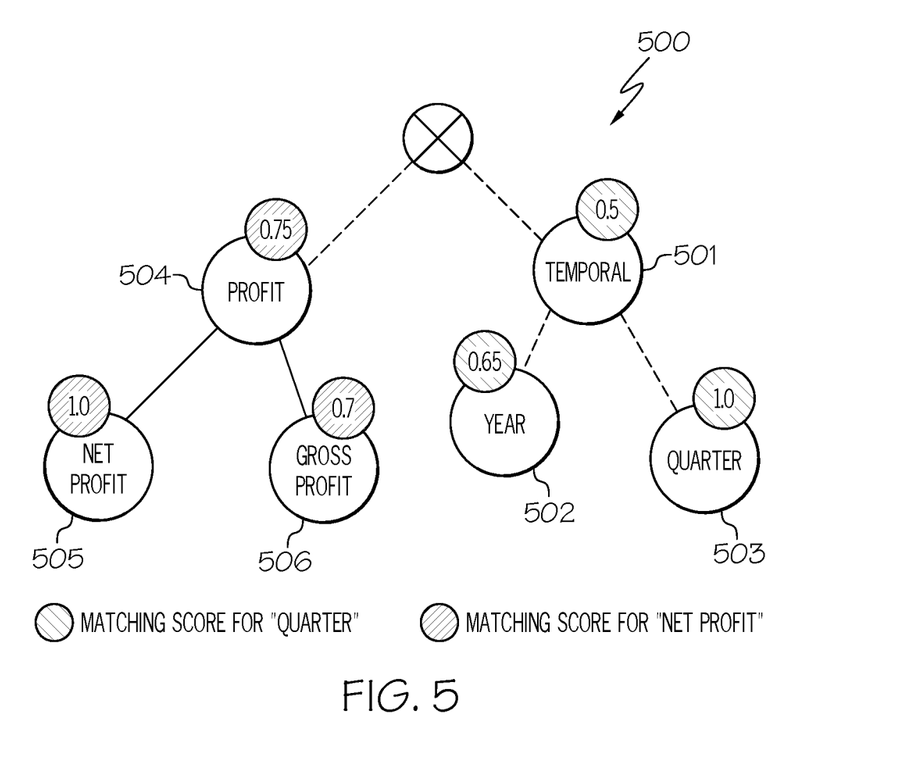
FIG. 5 illustrates a concept hierarchy in which topics are matched by traversing the concept hierarchy in accordance with an embodiment of the present invention.
Figure 6:
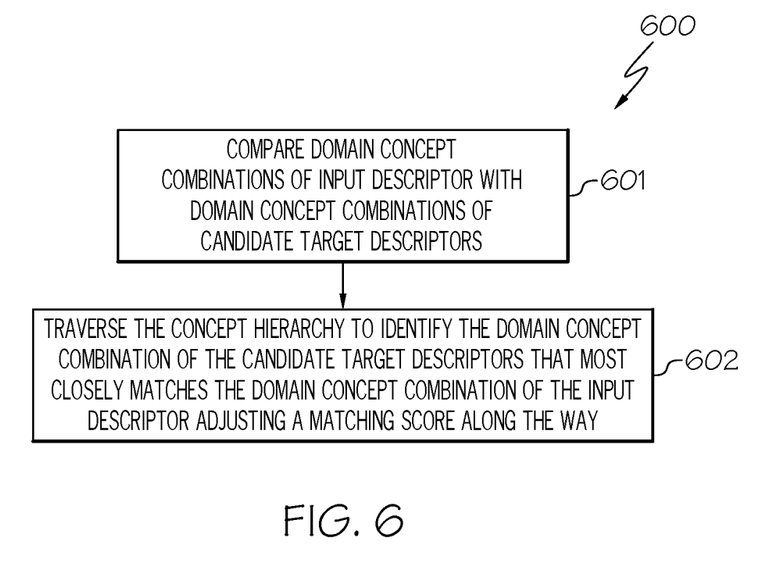
FIG. 6 is a flowchart of a method for matching the concept combinations in the input descriptor with the concept combinations in the candidate target descriptors in accordance with an embodiment of the present invention.
Figure 7:
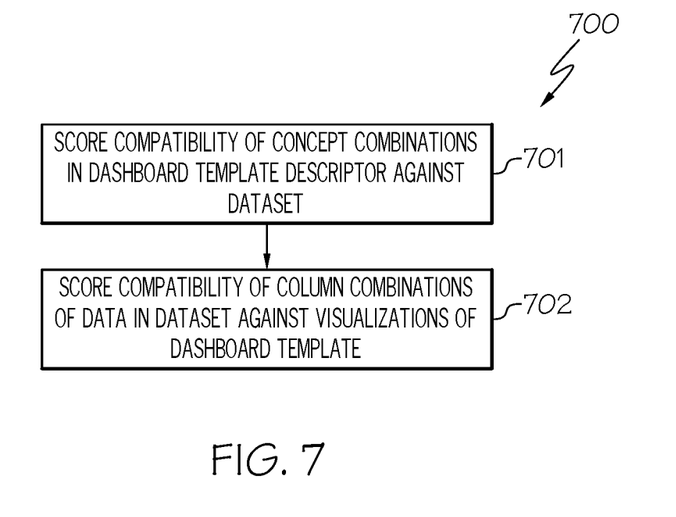
FIG. 7 is a flowchart of a method for determining the compatibility of the datasets with the dashboard templates in accordance with an embodiment of the present invention.

The embodiments of the present invention provide a means for enabling the most appropriate dashboard/dashboard template to visualize the user's dataset be identified by matching dashboard templates and datasets based on how a dataset's columns can be used in the dashboard templates' visualizations as discussed below in connection with FIGS. 3-7. FIG. 3 is a flowchart of a method for recommending a template based on the user's dataset or recommending a dataset based on the user's template. FIG. 4 is a flowchart of a method for matching topics in the input descriptor with the topics in the candidate target descriptors. FIG. 5 illustrates a concept hierarchy in which topics are matched by traversing the concept hierarchy. FIG. 6 is a flowchart of a method for matching the concept combinations in the input descriptor with the concept combinations in the candidate target descriptors. FIG. 7 is a flowchart of a method for determining the compatibility of the datasets with the dashboard templates.

As stated above, FIG. 3 is a flowchart of a method 300 for recommending a template based on the user's dataset or recommending a dataset based on the user's template in accordance with an embodiment of the present invention.

Referring to FIG. 3, in conjunction with FIGS. 1-2, in step 301, template/dataset recommender 105 extracts or fetches a descriptor (input descriptor) of the input, corresponding to a dataset or a dashboard template. In one embodiment, the input descriptor may be the descriptor of the dataset which includes topics and concept combinations. In one embodiment, the input descriptor may be the descriptor of the dashboard template which includes topics, concept combinations and column-to-visualization mappings. An example of a dataset descriptor or a dashboard template descriptor is shown below:

```
{
  {
    topic: ["Product Line", "Region"],
    conceptCombinations: [
      ["Revenue", "Product Line"],
      ["Sentiment", "Product Line"],
      ["Revenue", "Region"],
      ["Sentiment", "Region"]
    ]
  }
}
```

"Topics," as used herein, refer to high-level concepts that are the subject of the context of a collection of visualizations of the dashboard or the pivotal concepts in a dataset. "Pivotal concepts," as used herein, refer to those concepts that are crucial to the understanding of the dataset. For example, the pivotal concept of "baseball" is crucial to understanding the terms of "bat" and "base" in the dataset. In one embodiment, such topics are identified by template/dataset recommender 105 utilizing natural language processing to extract the meaning of the terms used in datasets or in visualizations of the dashboard. For example, terms, such as "bat," "ball," "player," and "base" used in the datasets or in the visualizations of the dashboard may be analyzed by template/dataset recommender 105 to derive the topic ("baseball") of the visualizations using natural language processing. It is noted for clarity that more than one topic may be extracted from the dataset or dashboard.

"Concept combinations," as used herein, refer to the joint utilization of two or more concepts, such as in a dataset or in a visualization of the dashboard. A "concept," as used herein, refers to an abstract idea or a general notion, such as a mental representation. In one embodiment, such concepts may be represented as objects, such as in a hierarchical ontology. In one embodiment, such concept combinations are identified in the dataset or dashboard template by template/dataset recommender 105 using IBM® Cognos® Analytics by mapping the columns in the dataset to ontological concepts or mapping the concepts identified in the dashboard of the dashboard template to ontological concepts. Such identified ontological concepts are grouped into combinations based on their usage in the dataset or their usage in the visualizations of the dashboard. For example, if such concepts are utilized together in a group, then such concepts would be grouped. For instance, in a grouped column graph visualization that displays "profit" values in the x-axis and "day of week" values in the y-axis and is grouped by "product types," then one of the concept combinations of the dashboard template descriptor will be ["Profit," "Day of Week," "Product Types"].

"Column-to-visualization mappings," as used herein, refer to how the concepts and statistics of the columns of the dataset are mapped to the visualizations depicted in the dashboard. For example, the concepts and statistics of the first column of the dataset may be mapped to a first portion of a visualization depicted in the dashboard and the concepts and statistics of the second column of the dataset may be mapped to a second portion of the visualization depicted in the dashboard.

In one embodiment, template/dataset recommender 105 utilizes IBM® Cognos® Analytics to extract column-to-visualization mappings from a dashboard. In one embodiment, template/dataset recommender 105 using IBM® Cognos® Analytics identifies the concepts of the columns used in each visualization and the manner in which they are used. In one embodiment, such concepts are identified using natural language processing. For example, terms, such as "profit" and "revenue," may be identified as "concepts" by template/dataset recommender 105 utilizing natural language processing. A "concept," as used herein, refers to an abstract idea or a general notion, such as a mental representation. In one embodiment, such concepts may be represented as objects, such as in a hierarchical ontology. In one embodiment, template/dataset recommender 105 using IBM® Cognos® Analytics identifies those concepts used in the visualizations that match those concepts represented in a hierarchical ontology.

Furthermore, in one embodiment, template/dataset recommender 105 using IBM® Cognos® identifies the manner in which the concepts are being used, such as being graphically displayed along a particular axis (e.g., x-axis).

For example, suppose a grouped column graph visualization of the dashboard displays "profit" values in the x-axis and "day of week" values in the y-axis and is grouped by "product types," then the column-to-visualization mappings will be:

```
{
  {
    chart: "ColumnGraph",
    slot: [
      "x-axis": ["Profit"],
      "y-axis": ["Day of Week"],
      "GroupedBy": ["Product Type"],
    ]
  }
}
```

In one embodiment, template/dataset recommender 105 extracts or fetches a descriptor of the input in response to user actions (both implicit or explicit). For example, template/dataset recommender 105 extracts or fetches a descriptor of the input in response to the selection of a dataset or dashboard template in the process of creating a dashboard. In another example, template/dataset recommender 105 extracts or fetches a descriptor of the input in response to the user instructing an agent to select a template for a dataset and create a dashboard or in response to the user instructing an agent to select a dataset for a dashboard template.

In step 302, template/dataset recommender 105 generates scores for the candidate targets, corresponding to dashboard templates or datasets, based on one or more of the following: matching topics in the input descriptor with topics in the candidate target descriptors, matching concept combinations in the input descriptor with concept combinations in the candidate target descriptors, and determining compatibility of the datasets with the dashboard templates. In one embodiment, candidate targets are provided by users and stored in database 104. A "target," as used herein, refers to the template (e.g., dashboard template) or dataset that is recommended by template/dataset recommender 105 based on the users' dataset or the user's template, respectively. A "candidate target," as used herein, refers to potential targets that could be recommended by template/dataset recommender 105 to be used by the user (user of computing device 101). A "candidate target descriptor," as used herein, refers to metadata describing the candidate target, which may include concepts, concept combinations, and statistics.

A further description of generating scores for the candidate targets is provided below in connection with FIGS. 4-7.

FIG. 4 is a flowchart of a method 400 for matching topics in the input descriptor with the topics in the candidate target descriptors in accordance with an embodiment of the present invention.

Referring to FIG. 4, in conjunction with FIGS. 1-3, in step 401, template/dataset recommender 105 compares the domain concepts of the input descriptor with the domain concepts of the candidate target descriptors.

A "domain model," as used herein, refers to a conceptual model of a domain in a graphical hierarchy ("concept hierarchy") that incorporates behavior and data. In particular, a domain model is a formal representation of the domain with concepts (e.g., real-world concepts), where the concepts include data, such as roles, datatypes, individuals and rules. A "concept," as used herein, represents a set or class of entities or "things" within a domain. A "domain," as used herein, refers to a sphere of knowledge, such as financial services.

In one embodiment, template/dataset recommender 105 identifies the topics (high-level concepts) in the input and candidate target descriptors. Such topics may be listed as "domain concepts" in the concept hierarchy, where the "domain concepts" refer to the concepts depicted in the concept hierarchy as shown in FIG. 5.

FIG. 5 illustrates a concept hierarchy 500 in which domain concepts are matched by traversing concept hierarchy 500 in accordance with an embodiment of the present invention.

Referring to FIG. 5, concept hierarchy 500 includes different levels of a hierarchy of concepts, such that each "child" concept (located on a lower level from a concept) includes a more specific classification of the "parent" concept (located on a higher level from the child concept). For example, as shown in FIG. 5, the concept "temporal" 501 is a parent concept to the child concepts of "year" 502 and "quarter" 503. Similarly, as shown in FIG. 5, the concept "profit" 504 is a parent concept to the child concepts of "net profit" 505 and "gross profit" 506. As shown in FIG. 5, domain concepts may be represented in concept hierarchy 500 as nodes, and, as discussed above, may include data, such as roles, datatypes, individuals and rules.

Returning to FIG. 4, in conjunction with FIGS. 1-3 and 5, in step 402, template/dataset recommender 105 traverses concept hierarchy 500 to identify the domain concept of the candidate target descriptors that most closely matches the domain concept of the input descriptor adjusting a matching score along the way as shown in FIG. 5. In one embodiment, template/dataset recommender 105 traverses concept hierarchy 500 utilizing the module of IBM® Cognos® Analytics ("concept ontology registry") that allows the service to traverse concept hierarchy 500 and to find relationships between different concepts. Such relationships may be identified based on a "matching score," where the higher the matching score, the greater the relationship between the concepts. "Relationship," as used herein, refers to the connection between the concepts in terms of semantic meaning. The higher the matching score, the greater the relationship between the concepts in concept hierarchy 500. That is, the higher the matching score, the greater the degree that the concepts have the same semantic meaning. In one embodiment, the matching score may correspond to a scaled score between 0 and 1.

For example, if the domain concept of the input descriptor was "net profit," concept hierarchy 500 is then traversed to find the closest matching concept to "net profit" in the domain concepts of the candidate target descriptors, which are depicted in concept hierarchy 500. As shown in FIG. 5, "net profit" 505 is a closer match to the domain concept of "net profit" in concept hierarchy 500 than the domain concept of "profit" 504 or the domain concept of "gross profit" 506 in concept hierarchy 500. For example, the matching score of "net profit" as an output topic is 1.0; whereas, the matching score of "profit" as an output topic is 0.75 or the matching score of "gross profit" as an output topic is 0.7 as shown in FIG. 5. Also, as shown in FIG. 5, the matching score is adjusted as hierarchy 500 is traversed.

In another example, if the domain concept of the input descriptor was "quarter," concept hierarchy 500 is then traversed to find the closest matching concept to "quarter" in the domain concepts of the candidate target descriptors, which are depicted in concept hierarchy 500. As shown in FIG. 5, "quarter" is a closer match to the domain concept of "quarter" 503 in concept hierarchy 500 than the domain concept of "temporal" 501 or the domain concept of "year" 502 in concept hierarchy 500. For example, the matching score of "quarter" as an output topic is 1.0; whereas, the matching score of "temporal" as an output topic is 0.5 or the matching score of "year" as an output topic is 0.65 as shown in FIG. 5. Also, as shown in FIG. 5, the matching score is adjusted as hierarchy 500 is traversed.

The closest matching concept corresponds to the concept with the highest matching score. For example, the topic of "net profit" in the input descriptor is matched with the topic of "net profit" in a candidate target descriptor. In another example, the topic of "quarter" in the input descriptor is matched with the topic of "quarter" in a candidate target descriptor.

Referring now to FIG. 6, FIG. 6 is a flowchart of a method 600 for matching the concept combinations in the input descriptor with the concept combinations in the candidate target descriptors.

Referring to FIG. 6, in conjunction with FIGS. 1-3 and 5, in step 601, template/dataset recommender 105 compares the domain concept combinations of the input descriptor with the domain concept combinations of the candidate target descriptors. For example, the domain concept combination of ["Net Profit", "Quarter"] in the input descriptor may be compared with the domain concept combinations of the candidate target descriptors.

"Domain concept combination," as used herein, refers to a combination of domain concepts. For example, such concepts may be used in combination in a visualization of the dashboard.

In step 602, template/dataset recommender 105 traverses concept hierarchy 500 to identify the domain concept combination of the candidate target descriptors that most closely matches the domain concept combination of the input descriptor adjusting a matching score along the way as shown in FIG. 5.

In one embodiment, template/dataset recommender 105 traverses concept hierarchy 500 utilizing the module of IBM® Cognos® Analytics ("concept ontology registry") that allows the service to traverse concept hierarchy 500 and to find relationships between different concepts, including different concept combinations. The process discussed above in identifying the domain concept of the candidate target descriptors that most closely matches the domain concept of the input descriptor is the same process in identifying the domain concept combination of the candidate target descriptors that most closely matches the domain concept combination of the input descriptor. For example, the matching score now indicates the degree that the concept combinations have the same semantic meaning. The higher the matching score, the greater the degree that the concept combinations have the same semantic meaning.

In one embodiment, concept hierarchy 500 is traversed to find the domain concept of the candidate target descriptors that most closely matches each of the domain concepts in the domain concept combination of the input descriptor. For example, if the domain concept combination of the input descriptor was ["Net Profit", "Quarter"], then concept hierarchy 500 is traversed to find the closest matching domain concept of the candidate target descriptors to the domain concept of "Net Profit" and the domain concept of "Quarter." In one embodiment, the matching score for each of these concepts may be combined to form a resulting match score that is used to identify the closest concept combination.

For example, if the domain concept combination of the input descriptor was ["Net Profit", "Quarter"], then concept hierarchy 500 is traversed to find the closest matching concept combination in the domain concepts of the candidate target descriptors to the domain concepts of "Net Profit" and "Quarter." For instance, the domain concept combination of ["Net Profit", "Quarter"] yields a higher matching score against the output concept combination of ["Net Profit", "Quarter"] than the output concept combination of ["Profit", "Year"] or ["Profit", "Quarter"].

The closest matching concept combination corresponds to the concept combination with the highest matching score. For example, the concept combination of ["Net Profit", "Quarter"] in the input descriptor is matched with the concept combination of ["Net Profit", "Quarter"] in a candidate target descriptor.

FIG. 7 is a flowchart of a method 700 for determining the compatibility of the datasets with the dashboard templates in accordance with an embodiment of the present invention.

Referring to FIG. 7, in conjunction with FIGS. 1-3 and 5-6, in step 701, template/dataset recommender 105 scores the compatibility of the concept combinations in the dashboard template descriptor against the dataset. In one embodiment, template/dataset recommender 105 utilizes IBM® Cognos® Analytics ("smarts content recommender" service) to score the compatibility of the concept combinations in the template descriptor against the dataset. In one embodiment, such a score is a scaled score between 0 and 1.

"Scoring the compatibility of the concept combinations in the dashboard template descriptor against the dataset," as used herein, refers to a score that indicates the degree that the concept combinations contained in the dashboard template descriptor occur in the dataset. The greater the degree that the concept combinations contained in the dashboard template descriptor occur in the dataset, the higher the score and vice-versa. For example, a dashboard template descriptor may contain topics (e.g., "Profit") and concept combinations (e.g., ["Profit", "Quarter"] that are not found in the dataset. IBM® Cognos® Analytics ("smarts content recommender" service) would then take that into account when scoring the compatibility.

In one embodiment, template/dataset recommender 105 utilizes IBM® Cognos® Analytics ("smarts content recommender" service) to identify the pivotal concepts (topics) in a dataset using natural language processing. In one embodiment, for each topic, IBM® Cognos® Analytics ("smarts content recommender" service) generates "interesting" concept combinations that provide insights into the visualization of the dashboard. Such "interesting" concept combinations refer to those concept combinations in the dataset that most likely relate to the identified topic. In one embodiment, such interesting concept combinations are identified by template/dataset recommender 105 using IBM® Cognos® Analytics ("smarts content recommender" service) based on identifying those concept combinations in the dataset that are most semantically similar in meaning to the identified topic using natural language processing. In another embodiment, such interesting concept combinations are identified by template/dataset recommender 105 using IBM® Cognos® Analytics ("smarts content recommender" service) based on deploying several data analysis techniques, including ontological classification of datasets, bivariate and multivariate analysis and driver analysis.

After identifying the concept combinations in the dataset, the more semantically similar the concept combinations contained in the dashboard template descriptor are to the concept combinations in the dataset, the higher the score and vice-versa.

In step 702, template/dataset recommender 105 scores the compatibility of column combinations of data in the dataset against the visualizations of the dashboard template. In one embodiment, IBM® Cognos® Analytics ("smarts visualization recommender" service) is utilized by template/dataset recommender 105 to score the compatibility of the column combinations of data in the dataset against the visualizations of the dashboard template.

"Scoring the compatibility of the column combinations of data in the dataset against the visualizations of the dashboard template," as used herein, refers to a score that indicates the degree that the column combinations of data contained in the dataset fit the visualizations of the dashboard template. The greater the degree that the column combinations of data contained in the dataset occur in the visualizations of the dashboard, the higher the score and vice-versa. For example, a dashboard may contain visualizations that are not compatible with the columns of data of the data set. For instance, the visualizations may require geographical locations which are not included in the dataset. IBM® Cognos® Analytics ("smarts visualization recommender" service) would then take that into account when scoring the compatibility.

In one embodiment, template/dataset recommender 105 utilizes IBM® Cognos® Analytics ("smarts content recommender" service) to identify the pivotal concepts (topics) in a dataset using natural language processing. In one embodiment, for each topic, IBM® Cognos® Analytics ("smarts content recommender" service) generates "interesting" column combinations of data that provide insights into the dataset. Such "interesting" column combinations of data refer to those column combinations of data in the dataset that most likely relate to the identified topic. In one embodiment, such interesting column combinations of data are identified by template/dataset recommender 105 using IBM® Cognos® Analytics ("smarts content recommender" service) based on identifying those column combinations of data that are most semantically similar in meaning to the identified topic using natural language processing. In another embodiment, such interesting column combinations of data are identified by template/dataset recommender 105 using IBM® Cognos® Analytics ("smarts content recommender" service) based on deploying several data analysis techniques, including ontological classification of datasets, bivariate and multivariate analysis and driver analysis.

After identifying such interesting column combinations of data in the dataset, the greater the degree that the column combinations of data contained in the dataset occur in the visualizations of the dashboard, the higher the score and vice-versa.

In one embodiment, the scores discussed above, in connection with FIGS. 4, 6 and 7, may be aggregated so as to generate a final score. In one embodiment, the final score may be compared to a threshold value, which may be user-selected. Those candidate targets (e.g., dashboard templates, datasets) that are associated with a score about the threshold value may then be selected to be recommended to the user as discussed below.

Returning to FIG. 3, in conjunction with FIGS. 1-2 and 4-7, in step 303, template/dataset recommender 105 recommends dashboard template(s) or dataset(s) based on the generated scores for the candidate targets, such as by presenting those dashboard template(s) or dataset(s) to the user's computing device 101 with a score that exceeds a threshold value, which may be user-selected. For example, if a user dataset is received, then template/dataset recommender 105 recommends dashboard template(s) that are associated with the highest score(s), such as those with a score exceeding a threshold value, which may be user-selected. Such dashboard templates may be stored in database 104 and then presented to the user of computing device 101 via the user interface of computing device 101.

In another example, if a user dashboard template is received, then template/dataset recommender 105 recommends the dataset(s) that are associated with the highest score(s), such as those with a score exceeding a threshold value, which may be user-selected. Such datasets may be stored in database 104 and then presented to the user of computing device 101 via the user interface of computing device 101.

In an alternative embodiment, only the dashboard template descriptors are saved in database 104 and the corresponding dashboard templates are created automatically after the user selects the corresponding recommended dashboard template.

In this manner, embodiments of the present invention recommend the most appropriate dashboard template to visualize the user's dataset. The most appropriate dashboard template is identified based on determining how a dataset's columns of data can be used in the dashboard template's visualizations.

Furthermore, in this manner, embodiments of the present invention recommend the most appropriate dataset based on the user's template (e.g., dashboard template).

Additionally, embodiments of the present invention utilize how combinations of concepts have been used within individual visualizations of a template to match the available concept combinations in the dataset.

Furthermore, embodiments of the present invention incorporate compatibility between column combinations of the dataset and visualizations of the template into the overall matching score.

Furthermore, the present invention improves the technology or technical field involving business analytics applications. As discussed above, currently, users may find it difficult to build a dashboard, such as a business analytics dashboard, to visualize their datasets. As a result, users may attempt to utilize an existing dashboard or dashboard template, such as by building from it. However, identifying the correct template for a dataset is a difficult task, especially since systems do not take into account the datasets that have been used with the templates and how they were used in the visualizations of the templates as discussed below. "Visualizations," as used herein, refer to the graphical elements of the dashboard, such as those graphical elements that depict information from the dataset. For example, suppose a financial specialist ("F1") builds a dashboard for financial planning purposes with a popular dataset ("S1"). The financial specialist ("F1") then makes the dashboard's template ("D") available for others to reuse. Suppose further that another financial specialist ("F2") is looking for a dashboard to visualize his/her dataset ("S2"). The system may recommend the dashboard template ("D") for a variety of reasons, such as being popular with financial specialists, meeting F2's style preferences and is indexed against "financial" concepts. However, the dataset S2 may not be best visualized with the dashboard template D for the following reasons: a visualization in dashboard template D requires a data type that is not available in dataset S2 (e.g., geographical locations); dataset S2's column concepts (such as those deemed interesting) may not be best visualized with dashboard template D (e.g., dashboard template D was used with dataset S1 to showcase the concepts of "profit" and "cost," but dataset S2 may be best visualized with a dashboard that showcases the concepts of current and target "revenue"); and dataset S2's concept combinations (such as those deemed interesting) may not be best visualized with dashboard template D (e.g., dataset S2 is best visualized with widgets showing "revenue by business" and "revenue by time"; whereas, dashboard template D contains widgets that best visualize "sales by product" and "profit by product"). As a result, there is not currently a means for identifying the most appropriate dashboard/dashboard template to visualize the user's dataset.

The present invention improves such technology by extracting or fetching a descriptor (input descriptor) of the input, corresponding to a dataset or a dashboard template. In one embodiment of the present invention, a descriptor (input descriptor) of the input, corresponding to a dataset or a dashboard template, is extracted or fetched. In one embodiment, the input descriptor may be the descriptor of the dataset which includes topics and concept combinations. In one embodiment, the input descriptor may be the descriptor of the dashboard template which includes topics, concept combinations and column-to-visualization mappings. "Topics," as used herein, refer to high-level concepts that are the subject of the context of a collection of visualizations of the dashboard or the pivotal concepts in a dataset. "Concept combinations," as used herein, refer to the joint utilization of two or more concepts, such as in a dataset or in a visualization of the dashboard. A "concept," as used herein, refers to an abstract idea or a general notion, such as a mental representation. "Column-to-visualization mappings," as used herein, refer to how the concepts and statistics of the columns of the dataset are mapped to the visualizations depicted in the dashboard. Furthermore, scores are generated for the candidate targets, corresponding to dashboard templates or datasets, based on one or more of the following: matching topics in the input descriptor with topics in the candidate target descriptors, matching concept combinations in the input descriptor with concept combinations in the candidate target descriptors, and determining compatibility of the datasets with the dashboard templates. A "target," as used herein, refers to the template (e.g., dashboard template) or dataset that is recommended based on the users' dataset or the user's template, respectively. A "candidate target," as used herein, refers to potential targets that could be recommended to be used by the user. A "candidate target descriptor," as used herein, refers to metadata describing the candidate target, which may include concepts, concept combinations, and statistics. Dashboard template(s) or dataset(s) are then recommended based on the generated scores for the candidate targets, such as by presenting those dashboard template(s) or dataset(s) to the user's computing device with a score that exceeds a threshold value. In this manner, the most appropriate dashboard template is recommended to visualize the user's dataset or the most appropriate dataset is recommended based on the user's template. Furthermore, in this manner, there is an improvement in the technical field of business analytics applications.

The technical solution provided by the present invention cannot be performed in the human mind or by a human using a pen and paper. That is, the technical solution provided by the present invention could not be accomplished in the human mind or by a human using a pen and paper in any reasonable amount of time and with any reasonable expectation of accuracy without the use of a computer.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer-implemented method for recommending a template or a dataset, the method comprising:
    extracting or fetching a descriptor of an input corresponding to a dataset or a dashboard or a dashboard template, wherein said descriptor of said dataset comprises topics and concept combinations, wherein said descriptor of said dashboard template comprises topics, concept combinations and column-to-visualization mappings;
    generating scores for candidate targets corresponding to dashboard templates or datasets based on one or more of the following: matching topics in said input descriptor with topics in candidate target descriptors, matching concept combinations in said input descriptor with concept combinations in said candidate target descriptors and compatibility of said datasets with said dashboard templates; and
    presenting one or more of said dashboard templates or one or more of said datasets to a user's computing device based on said scores for said candidate targets.

2. The method as recited in claim 1 further comprising:
    comparing domain concepts of said input descriptor with domain concepts of said candidate target descriptors.

3. The method as recited in claim 2 further comprising:
    traversing a concept hierarchy to identify a domain concept of said candidate target descriptors that most closely matches a domain concept of said input descriptor.

4. The method as recited in claim 1 further comprising:
    comparing domain concept combinations of said input descriptor with domain concept combinations of said candidate target descriptors.

5. The method as recited in claim 4 further comprising:
    traversing a concept hierarchy to identify a domain concept combination of said candidate target descriptors that most closely matches a domain concept combination of said input descriptor.

6. The method as recited in claim 1 further comprising:
    scoring compatibility of concept combinations in said dashboard template descriptor against said dataset.

7. The method as recited in claim 6 further comprising:
    scoring compatibility of column combinations of data in said dataset against visualizations of said dashboard template.

8. A computer program product for recommending a template or a dataset, the computer program product comprising one or more computer readable storage mediums having program code embodied therewith, the program code comprising the programming instructions for:
    extracting or fetching a descriptor of an input corresponding to a dataset or a dashboard or a dashboard template, wherein said descriptor of said dataset comprises topics and concept combinations, wherein said descriptor of said dashboard template comprises topics, concept combinations and column-to-visualization mappings;
    generating scores for candidate targets corresponding to dashboard templates or datasets based on one or more of the following: matching topics in said input descriptor with topics in candidate target descriptors, matching concept combinations in said input descriptor with concept combinations in said candidate target descriptors and compatibility of said datasets with said dashboard templates; and
    presenting one or more of said dashboard templates or one or more of said datasets to a user's computing device based on said scores for said candidate targets.

9. The computer program product as recited in claim 8, wherein the program code further comprises the programming instructions for:
    comparing domain concepts of said input descriptor with domain concepts of said candidate target descriptors.

10. The computer program product as recited in claim 9, wherein the program code further comprises the programming instructions for:
    traversing a concept hierarchy to identify a domain concept of said candidate target descriptors that most closely matches a domain concept of said input descriptor.

11. The computer program product as recited in claim 8, wherein the program code further comprises the programming instructions for:
    comparing domain concept combinations of said input descriptor with domain concept combinations of said candidate target descriptors.

12. The computer program product as recited in claim 11, wherein the program code further comprises the programming instructions for:
    traversing a concept hierarchy to identify a domain concept combination of said candidate target descriptors that most closely matches a domain concept combination of said input descriptor.

13. The computer program product as recited in claim 8, wherein the program code further comprises the programming instructions for:
    scoring compatibility of concept combinations in said dashboard template descriptor against said dataset.

14. The computer program product as recited in claim 13, wherein the program code further comprises the programming instructions for:
    scoring compatibility of column combinations of data in said dataset against visualizations of said dashboard template.

15. A system, comprising:
    a memory for storing a computer program for recommending a template or a dataset; and
    a processor connected to said memory, wherein said processor is configured to execute the program instructions of the computer program comprising:
        extracting or fetching a descriptor of an input corresponding to a dataset or a dashboard or a dashboard template, wherein said descriptor of said dataset comprises topics and concept combinations, wherein said descriptor of said dashboard template comprises topics, concept combinations and column-to-visualization mappings;
        generating scores for candidate targets corresponding to dashboard templates or datasets based on one or more of the following: matching topics in said input descriptor with topics in candidate target descriptors, matching concept combinations in said input descriptor with concept combinations in said candidate target descriptors and compatibility of said datasets with said dashboard templates; and presenting one or more of said dashboard templates or one or more of said datasets to a user's computing device based on said scores for said candidate targets.

16. The system as recited in claim 15, wherein the program instructions of the computer program further comprise:

comparing domain concepts of said input descriptor with domain concepts of said candidate target descriptors.

17. The system as recited in claim 16, wherein the program instructions of the computer program further comprise:

traversing a concept hierarchy to identify a domain concept of said candidate target descriptors that most closely matches a domain concept of said input descriptor.

18. The system as recited in claim 15, wherein the program instructions of the computer program further comprise:

comparing domain concept combinations of said input descriptor with domain concept combinations of said candidate target descriptors.

19. The system as recited in claim 18, wherein the program instructions of the computer program further comprise:

traversing a concept hierarchy to identify a domain concept combination of said candidate target descriptors that most closely matches a domain concept combination of said input descriptor.

20. The system as recited in claim 15, wherein the program instructions of the computer program further comprise:

scoring compatibility of concept combinations in said dashboard template descriptor against said dataset.

* * * * *